US012792593B2

(12) United States Patent
Hattori et al.

(10) Patent No.: US 12,792,593 B2
(45) Date of Patent: Nov. 10, 2026

(54) LLM-DRIVEN APPROACH FOR STRUCTURED DATA EXTRACTION FROM SEMI-UNSTRUCTURED DATA WITH ATTRIBUTE NAME OPTIMIZATION

(71) Applicant: Dell Products L.P., Round Rock, TX (US)

(72) Inventors: Leandro Takeshi Hattori, Campo Grande (BR); Claudio Romero, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/960,462

(22) Filed: Nov. 26, 2024

(65) Prior Publication Data

US 2026/0147750 A1 May 28, 2026

(51) Int. Cl.
*G06F 16/00* (2019.01)
*G06F 16/23* (2019.01)

(52) U.S. Cl.
CPC ................................ *G06F 16/2372* (2019.01)

(58) Field of Classification Search
CPC .................................................. G06F 16/2372
See application file for complete search history.

(56) References Cited

U.S. PATENT DOCUMENTS 12,038,941 B1 * 7/2024 Meedinti Bhaskara Reddy .......... G06F 16/258
12,393,619 B1 * 8/2025 Bhura ................ G06F 16/3329
2021/0264208 A1 * 8/2021 Damodaran ............. G06N 5/02
2022/0083561 A1 * 3/2022 Shillingford .......... G06F 16/258
2024/0354567 A1 * 10/2024 Duggal .................. G06N 3/006

OTHER PUBLICATIONS

Arora, Simran, et al. "Language Models Enable Simple Systems for Generating Structured Views of Heterogeneous Data Lakes." arXiv preprint arXiv:2304.09433 (2023).
Lewis, Mike, et al. "Bart: Denoising sequence-to-sequence pre-training for natural language generation, translation, and comprehension." arXiv preprint arXiv:1910.13461 (2019).
Hugging Face. (n.d.). Facebook/bart-large-mnli [Model]. Hugging Face. https://huggingface.co/facebook/bart-large-mnli.
Jiang, Albert Q., et al. "Mistral 7B." arXiv preprint arXiv:2310.06825 (2023).
Dell Technologies. (n.d.). Apex storage for public cloud simplifies multicloud complexity. Retrieved from https://www.dell.com/en-us/blog/apex-storage-for-public-cloud-simplifies-multicloud-complexity/.
Barker, Ken, et al. "IBM MNLP IE at CASE 2021 task 2: NLI reranking for zero-shot text classification." Proceedings of the 4th Workshop on Challenges and Applications of Automated Extraction of Socio-political Events from Text (CASE 2021).

* cited by examiner

*Primary Examiner* — Syed H Hasan
(74) *Attorney, Agent, or Firm* — Workman Nydegger

(57) ABSTRACT

One example method includes performing a first data ingestion process that includes (1) receiving a complete SUD (semi-unstructured data) dataset from a data lake and (2) returning a list of prompts for each SUD type with the complete SUD dataset, performing, by an LLM (large language model) a knowledge extraction process on the complete SUD dataset, and the knowledge extraction process uses optimized attribute names and the list of prompts for each SUD to obtain a complete structured dataset, and returning the complete structured dataset to the data lake.

20 Claims, 8 Drawing Sheets

500

| Data-type | Precision | Recall | F1 | Mistral version |
|---|---|---|---|---|
| HTML | 80% | 51.12% | 62.38% | V0.1 |
| HTML *one-shot | 100% | 100% | 100% | V0.1 |
| XML | 100% | 100% | 100% | V0.1 |
| Email | 86.98% | 96.94% | 91.69% | V0.1 |
| | | | | |

FIG. 5

600

From: John Doe <johndoe@example.com>

To: jane@example.com

Subject: Meeting Agenda

Date: November 27, 2023

Time: 09:00 AM

Dear Jane,

I hope this message finds you well. I'm writing to share the agenda for our upcoming meeting scheduled on November 27, 2023, at 9:00 AM.

Looking forward to discussing important topics regarding our ongoing projects.

Best regards,

John Doe

FIG. 6

700

```
<!DOCTYPE html>

<html>
<head>
    <title>CPU Information</title>
</head>
<body>
   <table>
       <tr>
          <th>CPU Name</th>
          <th>Core Count</th>
          <th>Socket Type</th>
          <th>MSRP</th>
          <th>Launch Date</th>
       </tr>
```

```
       <tr>
          <td>CPU1</td>
          <td>4</td>
          <td>Socket AM4</td>
          <td>$199</td>
          <td>2021-01-01</td>
       </tr>
   </table>
</body>
</html>
```

FIG. 7

800

From: John Doe <johndoe@example.com>

To: jane@example.com

Subject: Meeting Agenda

Date: November 27, 2023

Time: 09:00 AM

Dear Jane,

I hope this message finds you well. I'm writing to share the agenda for our upcoming meeting scheduled on November 27, 2023, at 9:00 AM.

Looking forward to discussing important topics regarding our ongoing projects.

Best regards,
John Doe

FIG. 8

900

| ***Metric*** | ***HTML*** | ***XML*** | ***EMAIL*** |
|---|---|---|---|
| *Precision* | *100%* | *100%* | *95.67%* |

FIG. 9

LLM-DRIVEN APPROACH FOR STRUCTURED DATA EXTRACTION FROM SEMI-UNSTRUCTURED DATA WITH ATTRIBUTE NAME OPTIMIZATION

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to semi-unstructured data (SUD). More particularly, at least some embodiments relate to systems, hardware, software, computer-readable media, and methods, for transforming SUD into structured data.

BACKGROUND

One conventional approach for addressing the problem of obtaining structured data from SUD is referred to as EVAPORATE, disclosed in "Arora, Simran, et al. 'Language Models Enable Simple Systems for Generating Structured Views of Heterogeneous Data Lakes.' arXiv preprint arXiv: 2304.09433 (2023)" (Arora). Arora discusses three different versions of this approach, each of which is accompanied by particular problems and shortcomings.

The first of these versions is 'Direct' in which SUD is sent directly to the OpenAI service to be processed. This approach is costly because the service provider is paid per processed token. In a data lake scenario, there are typically thousands, or more, of data items to be processed, making the Direct approach unfeasible. Additionally, there is a lack of data security, privacy, and governance in this approach, since it is necessary to send the data to this third-party service.

The second of the three versions is CODE, in which a set of examples of SUD are dispatched to the OpenAI service to synthesize function extraction. This version lacks accuracy, and the functions are less semantically capable and less flexible for analyzing different data formats and structured patterns, and the user still needs to send their data to the third-party service. Finally, this approach is only able to handle a single data type.

The third of the three EVAPORATE versions is CODE+, in which a set of examples of SUD is sent to the OpenAI service to synthesize an ensemble of functions. As with CODE, this approach is less semantically capable and less flexible in terms of analyzing different data formats and structured patterns compared to the direct approach. In this approach, the user must send more and different data samples to the third-party service to synthesize distinct functions. As with CODE, this CODE+ approach is only able to handle a single data type.

As noted above, all of the EVAPORATE versions lack the ability to process different data types. Moreover, those approaches are characterized by a lack of data security, privacy, and governance. Finally, those approaches all assume that the user can send effective attribute names to enable extraction of the information inside the document, which is not necessarily the case.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 5 discloses experimental results obtained with one example embodiment.

FIG. 6 discloses an example HTML sample used by an embodiment in one experiment.

FIG. 7 discloses an example XML sample used by an embodiment in one experiment.

FIG. 8 discloses an example email sample used by an embodiment in one experiment.

FIG. 9 discloses some example experimental results.

DETAILED DESCRIPTION OF SOME EXAMPLE EMBODIMENTS

Figure 1:
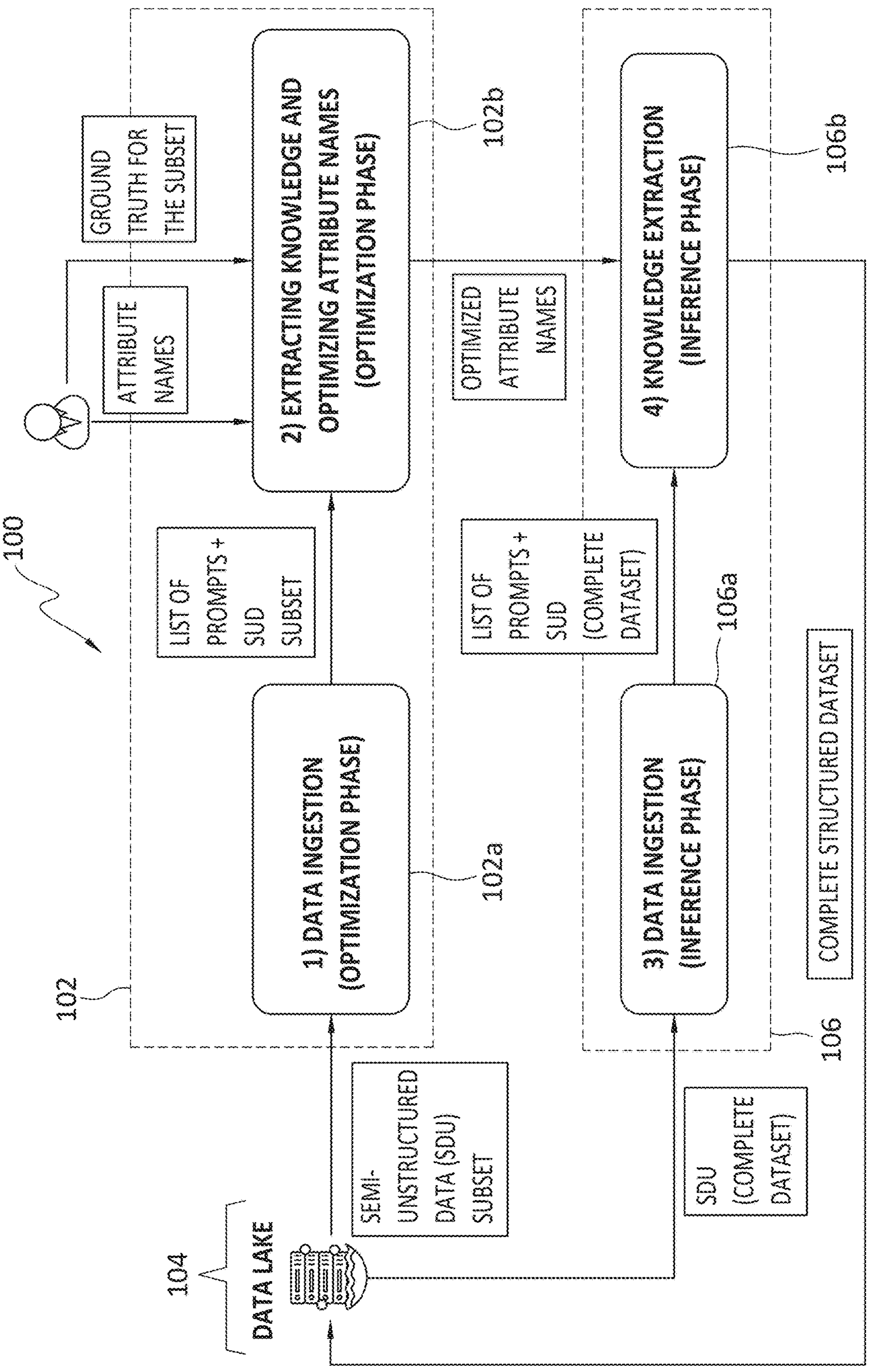
FIG. 1 discloses aspects of an overall pipeline and method, according to one embodiment.

Embodiments disclosed herein generally relate to semi-unstructured data (SUD). More particularly, at least some embodiments relate to systems, hardware, software, computer-readable media, and methods, for transforming SUD into structured data.

One or more embodiments comprise methods and/or pipelines for the transformation of semi-unstructured data (SUD), such as data contained in a data lake, into structured data. An embodiment may use a sample of data in a data lake to select recommended prompts which, in one embodiment, comprise the best prompts, for knowledge extraction that may then be used to structure all of the data in the data lake.

One such method may comprise an optimization phase, followed by an inferencing phase. The optimization phase may comprise a data ingestion process in which SUD is sampled from a data lake, and then prompts identified that may be used to process the data of the subset obtained in the sampling. Next, the optimization phase may comprise a process that comprises the extraction of knowledge and optimization of attribute names, which may be referred to herein as 'EKOAN.' In the EKOAN process, an embodiment may receive the SUD subset and the list of the most appropriate prompts for each example data type obtained during the data ingestion process. When the optimization phase has been completed, the method may move to an inference phase.

In an embodiment of the inference phase, a data ingestion process is performed in which the complete SUD dataset is received from the data lake, and a list of prompts for each SUD is obtained. After the data ingestion process of the inference phase, a knowledge extraction process is performed that uses the optimized attribute names obtained in the EKOAN process and the list of prompts for each SUD with the complete SUD dataset from the data ingestion process. This knowledge extraction process processes this information using an LLM to obtain a complete structured dataset. These outputs, including the complete structured dataset and the list of prompts, are then returned to the data lake.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that SUD of multiple different data types may be transformed into structured data. An embodiment may convert SUD into structured data, while also preserving the privacy of that SUD and structured data. An embodiment may generate structured data from SUD in a manner that is relatively more cost-effective than token based approaches. An embodiment may provide a mechanism for self-improvement of attribute names provided by users. Various other advantages of one or more example embodiments will be apparent from this disclosure.

A. REFERENCES

Reference may be made herein to the following documents. Each of these documents is incorporated herein in its entirety by this reference.

[1] Arora, Simran, et al. "Language Models Enable Simple Systems for Generating Structured Views of Heterogeneous Data Lakes." arXiv preprint arXiv: 2304.09433 (2023).

[2] Lewis, Mike, et al. "Bart: Denoising sequence-to-sequence pre-training for natural language generation, translation, and comprehension." arXiv preprint arXiv: 1910.13461 (2019).

[3] Hugging Face. (n.d.). Facebook/bart-large-mnli [Model]. Hugging Face. https://huggingface.co/facebook/bart-large-mnli.

[4] Jiang, Albert Q., et al. "Mistral 7B." arXiv preprint arXiv: 2310.06825 (2023).

[5] Dell Technologies. (n.d.). Apex storage for public cloud simplifies multicloud complexity. Retrieved from https://www.dell.com/en-us/blog/apex-storage-for-public-cloud-simplifies-multicloud-complexity/.

[6]. Barker, Ken, et al. "IBM MNLP IE at CASE 2021 task 2: NLI reranking for zero-shot text classification." Proceedings of the 4th Workshop on Challenges and Applications of Automated Extraction of Socio-political Events from Text (CASE 2021).

B. CONTEXT FOR ONE OR MORE EMBODIMENTS

The following is a discussion of aspects of a context for various embodiments. This discussion is not intended to limit the scope of the claims or this disclosure, or the applicability of the embodiments, in any way.

Transforming Semi-Unstructured Data (SUD), such as text, JSON, and XML, for example, into a structured format poses a significant challenge. The inherent flexibility and variability of SUD make it resistant to the rigid structures demanded by traditional databases. This lack of a clear set of rules or structure hinders the seamless generation of a coherent and organized view that would be easy to audit, verify, and extract insights from.

As organizations such Dell Technologies, FedEx, and Walmart increasingly rely on diverse data sources and have created enormous Data Lakes, it becomes useful to develop uncomplicated and automatic ways to convert SUD into a structured format. The process requires smart methods and tools to spot and use patterns in the data, turning messy, irregular data into something orderly and clear.

The current approach to handle SUD involves using external Large Language Models (LLMs) services to extract structured views. See [1]. However, this approach relies on external services, and lacks data privacy and governance. In contrast, literature highlights open-source models that can be deployed to on-prem servers, offering a more secure alternative. External services, typically paid per token, become impractical for enormous data lake processing, while deploying open-source LLMs models proves to be a cost-effective solution.

Literature approaches are specialized in processing only one type of SUD, and this type of approach is applicable only in a very controlled and restricted scenario. Also, it is posited that optimal attribute names are employed for information retrieval within documents, a notion supported by empirical evidence. In this scenario, there persists a demand for automated methodologies to enhance and streamline this process further.

Although open-source LLMs may be perceived as less capable than external services, leveraging specific prompts tailored to different data types can help to achieve more effective results. In this sense, an embodiment comprises an approach to generate a structured view from a hybrid SUD, that is, an SUD comprising a mix of different data types, leveraging open source LLMs. Some of the challenges addressed by one or more embodiments are addressed in more detail below.

One such challenge is privacy. In particular, using external LLM (Large Language Model) services for converting SUD into a structured format can compromise data privacy and governance. Another challenge is cost. Using external LLM services implies significant costs, and this can be impractical for some applications, like large data lakes. A further challenge is that typical approaches for transforming SUD into structured views deal with only one type of data type and don't consider a hybrid scenario. As a final example, there is a lack of mechanisms to self-improve attribute names given by the users, which is an important aspect given the semantic interpretation of the models and the information contained within the SUD.

C. OVERVIEW OF ASPECTS OF ONE OR MORE EMBODIMENTS

C.1 Introduction

One or more embodiments may deal with challenges such as those noted above by implementing a more adaptable approach to dealing with different data types of documents automatically, making it possible to select a recommended prompt. In one embodiment, a recommended prompt may be the best prompt. This feature may enable an embodiment to utilize open-source LLMs, which are less efficient in general terms, but with the most appropriate prompt, can achieve efficient performance. That is, while the use, in one or more embodiments of such open-source LLMs may be counter-intuitive, in view of their relatively lower efficiency, an embodiment may employ these LLMs in such a way as to take advantage of their functionality, while avoiding or attenuating their shortcomings.

Using an open-source LLM, it is possible to pass the data types directly, like EVAPORATE-direct, with the advantage of paying only per infrastructure to run this model, which can be used for other use cases as well. This feature may be a satisfactory solution in a data lake use case, where there are numerous SUDs to be processed daily. Additionally, running this model locally, an embodiment may establish and maintain control over data security, privacy, and governance.

Lastly, unlike conventional approaches, one example embodiment enables users to improve the attribute names automatically. This feature is useful given that the semantics of the attributes are important for the direct approach extraction. For example, 'sender information' for an LLM could be the name, full name, or the email address, ID, and many others.

As explained above then, one or more embodiments may harness the potential of open-source LLMs to process data directly with different data types and optimize attribute names. Various embodiments may possess additional, or alternative, features as well.

C.2 Zero-Shot Classifier

Following is a brief discussion of a zero-shot classifier, such as may be employed in one or more embodiments. Traditional classifiers are trained on labeled data to recognize specific categories or classes. However, in many real-world scenarios, it is not feasible to have labeled examples for every category that the classifier might encounter. See [6]. This limitation is where Zero-Shot classification may come into play. Zero-Shot Classification enables a model to generalize beyond its training data by recognizing and categorizing inputs it has never seen before. This is achieved by leveraging additional information such as textual descriptions or attributes associated with each class during training. Through this approach, the classifier, or model, learns to make predictions for classes it has not been explicitly trained on, hence the term "zero-shot," the classifier can classify examples with zero prior exposure. See [3].

C.3 Discussion

One example embodiment comprises a method that comprises two main phases, namely, (1) optimization, and (2) inference. In one embodiment, the optimization phase may be thought of as an offline training phase, and the inferencing phase as an on-line phase performed in a production or operations environment.

C.3.1 Optimization Phase

As noted elsewhere herein, an optimization phase may comprise two parts, namely, a data ingestion process, and an EKOAN (extracting knowledge and optimizing attribute names) process. These are discussed in turn below.

The first process in an example optimization phase is a data ingestion process. Here, a subset of semi-unstructured data (SUD) is received from a data lake, and the data ingestion process returns a list of the most appropriate prompts to process each data from the subset.

The second process in an example optimization phase is an EKOAN process. In the EKOAN process, an embodiment may receive the SUD subset and the list of the most appropriate prompts for each example from the previous data ingestion process. An EKOAN process according to one embodiment may comprise various operations that are performed after the SUD subset and prompts have been received. Such operations may include, but are not limited to:

a. for each data from the subset, send this data with its respective prompt from the list as an input to the LLM;
b. the output is a structured view, for example, a CSV file—the output is compared with the ground truth, which may be provided by a user;
c. if this comparison performance is lower than a threshold value, attempt to rewrite the attribute names, that are underperforming, using the LLM;
d. these new attribute names are sent again to be processed and evaluated again;
e. the operations (a.) through (d.) above may be performed recursively until the threshold value has been achieved or other stop criteria have been met, such as time or number of iterations;
f. then, the output with the optimized attribute names is generated and sent to the inference phase.

C.3.2 Inference Phase

In an embodiment, an inference phase is performed after completion of the optimization phase. The inference phase may comprise, but is not limited to, the following operations:

a. data ingestion—this operation may comprise receiving the complete SUD dataset from the data lake, and then returning the list of prompts for each SUD within the complete SUD dataset; and
b. knowledge extraction—this operation may comprise using the optimized attribute names from EKOAN step and a list of prompts for each SUD with the complete SUD dataset from the previous step—this operation may comprise processing this information using an LLM to obtain a complete structured dataset, and then returning these outputs to the data lake.

C.3.3 Hybrid Data Type Support & Data Privacy and Governance Using Open Source LLM One or more embodiments are configured to handle hybrid data types, that is, multiple different data types, addressing the limitations of existing methods that focus only on one type of data. In an embodiment, the hybrid data types may be handled using a classifier or a zero-shot classifier model and observing a file extension to understand what the data type is. This information may enable an embodiment to choose the appropriate prompt and achieve higher quality extractions.

The ability of an embodiment to identify what data type the model is dealing with enables the user of less capable models, such as the open-source LLMs for example. Also, this capability enables an embodiment to run locally, and control data governance and privacy. In addition, running this model locally, as in the case of one or more embodiments, may make it easier to pay for the infrastructure and not per-token processed. Thus, local use of the model may be feasible in a data lake circumstance by accommodating diverse data structures and formats, including combinations of SUD, and thus ensuring versatility and applicability across a wide range of data sources and use cases.

C.3.4 User Feedback Loop

One embodiment comprises a feedback loop mechanism that enables users to provide input on the suggested attribute names, and also make corrections or refinements as needed. In an embodiment, this can be done, for example, by using the reasoning capability of the LLMs to rewrite synonyms words that could be used to extract the attributes from the SUD. In an embodiment, this iterative process may enable continuous improvement of the attribute naming process, ensuring that the structured views accurately reflect the user preferences and domain-specific terminology over time.

D. DETAILED DISCUSSION OF ASPECTS OF ONE OR MORE EMBODIMENTS

One or more embodiments comprise an approach to generate structured views from hybrid Semi-Unstructured Data (SUD) and attribute name optimization for a data lake data management scenario. An example embodiment may, as introduced earlier herein, comprise two main phases, namely, an optimization phase, and an inference phase.

Incorporating hybrid data detection and attribute name optimization into a pipeline that generates a structured view from SUD may provide various benefits. For example, hybrid data detection ensures comprehensive coverage and accurate interpretation of diverse data types, facilitating the data driven process. As another example, attribute name optimization enhances data usability and standardization, streamlining integration and analysis processes. These advanced techniques improve the quality and reliability of the structured view.

With attention now to FIG. 1, there is disclosed a pipeline 100 according to one example embodiment. As shown, the pipeline 100 may comprise two primary phases, an optimization phase 102 where in a data ingestion process 102*a*, the pipeline 100 receives SUD subsets from a data lake system 104 and identifies the best list of prompts for each data in the subset. Next, an EKOAN operation 102*b* uses this list of prompts with each SUD subset sample, and the attribute names sent by the user of the system to generate the structured views from the SUD subset. This EKOAN operation 102*b* processes the attribute names to find more appropriate ones and send the optimized attribute names to the inference phase.

The second main phase in the example of FIG. 1 is the inference phase 106, where the pipeline 100 also executes a data ingestion process 106*a* by receiving the complete SDU dataset, and then selects the best list of prompts for each data. This best list of prompts, along with the complete SDU dataset, and the optimized attribute names from the EKOAN operation 102*b*, is then provided as input to a knowledge extraction process 106*b*. The knowledge extraction process 106*b* then processes these various inputs, and generates an output, which may comprise, in one embodiment, is a structured view, possibly comprising a table, of the complete structured dataset, that is then returned to the data lake system 104. We discuss the details of this overall pipeline solution in the following sections.

D.1 Structuring Semi-Unstructured Supply Chain Data

Consider a supply chain area that contains information about various suppliers for a company. Each supplier offers their product information in different data formats or semi-unstructured data (SUD). Some example data types that may be employed in one or more embodiments include, but are not limited to, text, HTML, JSON, XML, among others. In this scenario, the company may want to organize and obtain a structured view of these data.

One embodiment may address this problem by automating this process using an open-source LLM to perform this task by identifying the data type using a Zero-Shot Classifier (ZSC) approach. This model may enable an embodiment to retrieve the best prompt to deal with the identified data type.

It is noted that as used herein, a "prompt" embraces a question or directive that guides the extraction, analysis, or transformation, of data, such as SUD, that may have some consistent structure but may also contain free-text or varied formatting. SUD may include elements such as tags, labels, or attributes, mixed with unstructured content, such as text within an XML or JSON document or log entries. To illustrate, an example prompt might be: "Given a dataset in JSON format containing customer reviews with structured fields, such as 'date' and 'rating,' and unstructured text, such as 'review_content,' extract the following insights: (1) the average rating; (2) common keywords from the 'review_content' field; and (3) any dates mentioned within the review text. Present the findings in a summary format." In this example prompt, the structured parts, such as "rating" and "timestamp," serve to guide data extraction, while the unstructured parts, such as "review_content" or "message text," require analysis to identify patterns or insights.

After obtaining the prompts for each data type, a user may then send the attribute names required to be extracted. Additionally, examples of the output, in structured format, for a subset of these documents are sent.

It is noted that as used herein, an "attribute" name for SUD embraces a key or label that identifies a particular piece of information within a data record, while allowing for some variability in structure. SUD may have elements of both structured data, that is data that has been organized and labeled, and unstructured data that lacks a rigid format. Thus, SUD may contain labels or tags that indicate attributes but allows different records to vary in terms of which attributes are included or how they are structured. In general, attributes in SUD may help maintain readability and provide context to the data, even if the structure varies across entries. The following examples are illustrative. In an XML document, tags such as <name> or <email> serve as attributes that label specific data elements but allow for different records to have varying sets of tags. In JSON data, attributes are represented by keys, such as "name" or "price," where each key points to a specific piece of data. However, different JSON objects may contain different sets of keys or nested structures.

An embodiment may receive, such as from a user, the attribute names required to be extracted, and examples of the output, in structured format, for a subset of the documents. An embodiment may then attempt to perform knowledge extraction using the user provided attribute names, the prompt identified for the SUD, and the SUD data, and then performance of the extraction process may be evaluated. If the performance is found to be below the desired level, the LLM tries to find another similar attribute name. This new similar attribute name replaces the previous one, and a new extraction is performed to verify the output. In an embodiment, this process may be iterated until the desired performance is achieved or based on several iterations or processing time. In these latter cases, the best set of attribute names is obtained based on the performance log.

After this optimization, the full set of data, such as all the SUD from the data lake, is sent to the system for processing. Then, a zero-shot classifier may be used to classify all of the SUD, and the information with the data is sent for the generation of the structured view using the optimized attribute names from the previous process, that is, from the EKOAN process. Finally, the structured view from the entire dataset is sent back to the user, ready to be used by other applications, examples of which include, but are not limited to, audits, applied statistical approaches, Power BI, and ML (machine learning) models.

As discussed above then, an embodiment may handle hybrid SUD, could help solve the problem noted in the supply chain example above. Additionally, one embodiment uses open source LLM models, which despite having lower performance compared to closed source services, can achieve interesting results when provided with a more appropriate prompt, as discussed further in the experiments disclosed herein. Running this open source LLM in an on-premise environment enables full control over data privacy and governance. Furthermore, the user pays only for the infrastructure, allowing it to run for an entire data lake. Also, the user can utilize the open-source LLM for other purposes, enhancing its cost-benefit aspects. Moreover, given that an example embodiment optimizes attribute names, it can achieve more customizable and better solutions for the user.

D.2 Aspects of an Example Optimization Phase

D.2.1 Data Ingestion

Figure 2:
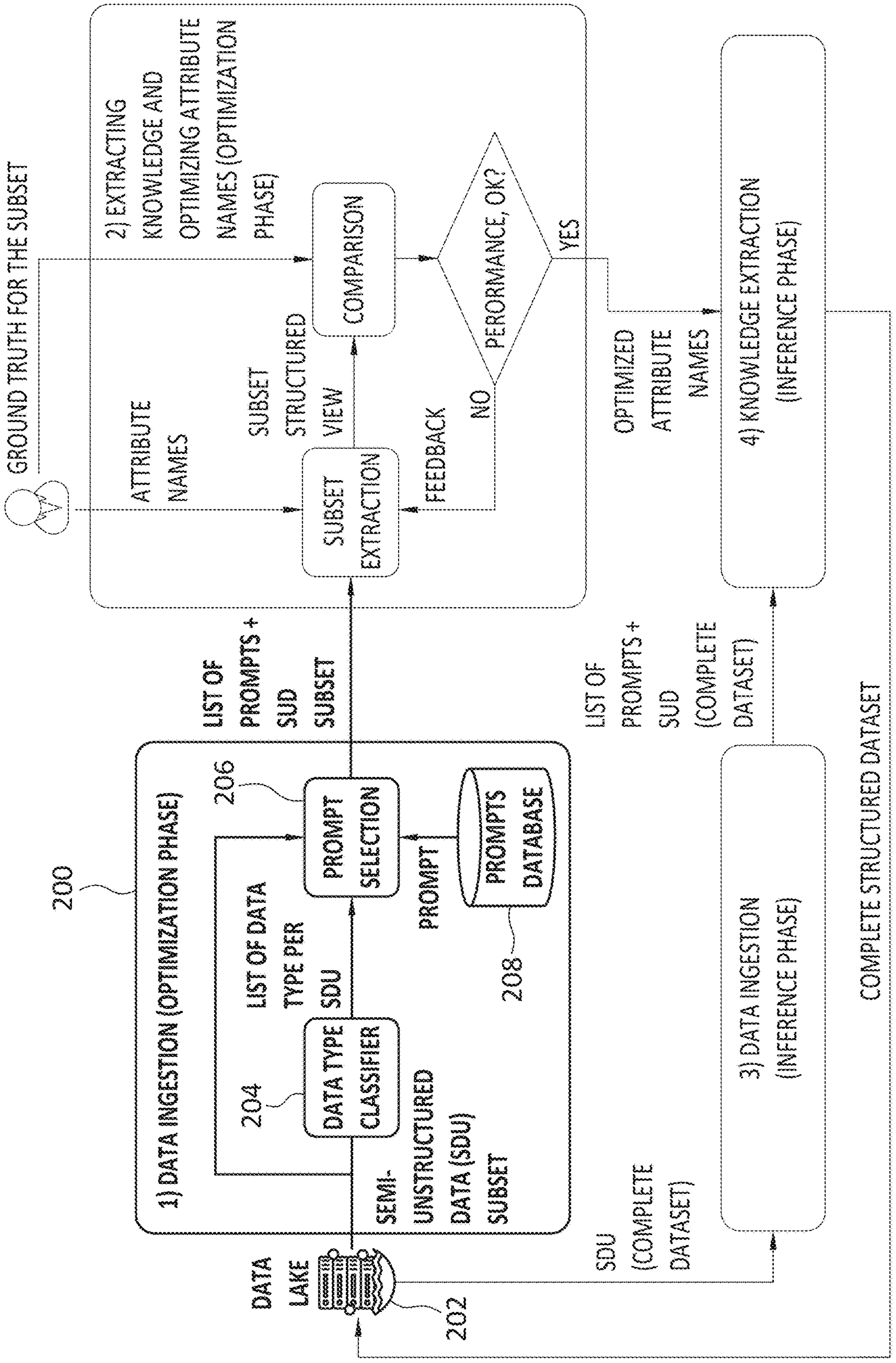
FIG. 2 discloses aspects of a data ingestion process, according to one embodiment.

In an embodiment, the data ingestion process enables the extraction of structured views from different SUD types, as depicted at 200 in FIG. 2 (see also reference 102*a* in FIG. 1). As shown in FIG. 2, an embodiment may receive, or extract, SUD from a data lake 202, which may comprise a repository rich in diverse data sets. In the data type classifier 204 activity, an embodiment may employ a zero-shot classifier (ZSC) model, for example, bart-large-mnli (see [3]), to understand the content of each SUD, and to ensure comprehensive coverage of its nuances and complexities. Some example data types, or classes, might be XML, HTML, email, and text, among others. The output of the classification of each document comprises a list of data types for each SUD subset. Next, prompt selection operation 206 may select the most appropriate prompt for each SUD. In an embodiment, a prompts database 208 contains prompts for each data type class configured in the ZSC model and may be populated offline.

D.2.2 Extracting Knowledge and Optimizing Attribute Names (EKOAN)

Figure 3:
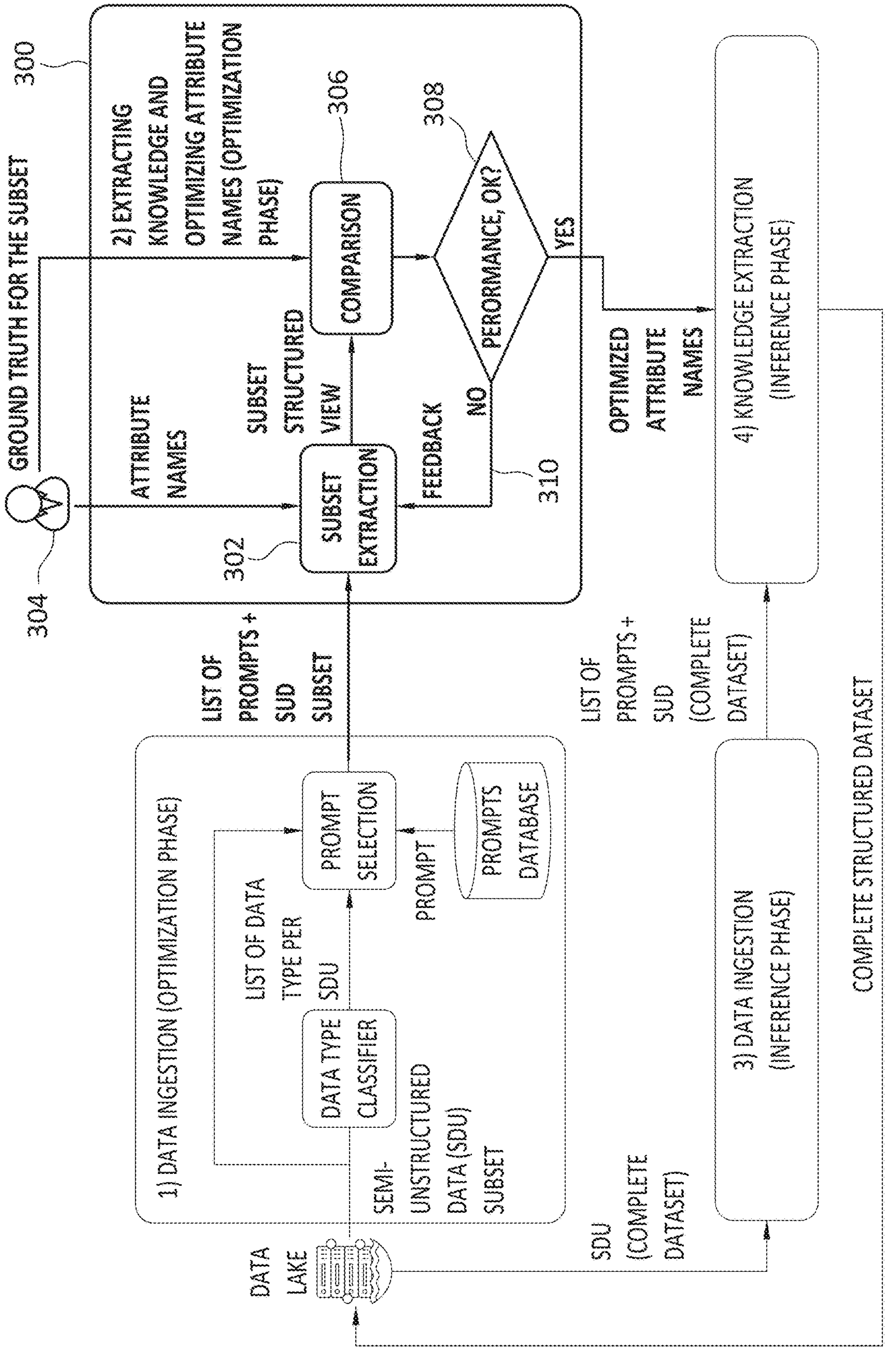
FIG. 3 discloses aspects of an EKOAN process, according to one embodiment.

In an embodiment, an EKOAN process, generally indicated at 300 in FIG. 3, performs data processing with iterative optimization strategies to enhance the extraction of structured knowledge from SUD while refining attribute names to better align with user expectations. One embodiment may initiate the knowledge extraction process by the subset extraction activity. Next, the subset of SUD and a corresponding list of prompts are received, as depicted in FIG. 3, and leveraging open-source LLM capabilities, such as the Mistral LLM (see [4]), to interpret the prompts for each SUD to extract pertinent knowledge from the SUD and encapsulate the pertinent information into a structured view.

With attention now to the example of FIG. 3, further details are provided concerning an embodiment of a process 300 for extracting knowledge and optimizing attribute names. After subset extraction 302 and generation of a structured view of the extracted subset using the attribute names provided by the user 304, the process 300 evaluates, or compares 306, the structured subset against the ground truth, also provided by the user 304.

Particularly, let SV represent the structured view of the subset generated by an embodiment. $AN_u$ denotes the attribute names provided by the user 304 and GT represents the ground truth provided by the user. An embodiment defines Perf ($AN_u$, GT) as the performance measure of the user-supplied attribute names compared to the ground truth, where Perf can be evaluated using metrics such as F1-score, precision, and recall.

$$Perf(AN_u, GT) = \frac{2 \times \text{precision} \times \text{recall}}{\text{precision} + \text{recall}}.$$

In an embodiment, a performance threshold θ is set within the range [0, 1], where 0 represents no constraint and 1 indicates perfect extraction. If, as determined at 308, Perf ($AN_u$, GT)<θ, an iterative optimization process is initiated.

During optimization, attribute names are iteratively rewritten based on contextual insights from SV using the LLM capability. To facilitate this rewriting process, one embodiment inserts the historical attribute names (HAM) that were tested into the prompt context to avoid repetition. In the begin of the optimization step, an embodiment may extract the document context (DC) that it is working on from the SUD subset content to bias the generation of new attribute names toward the relevant context.

In particular, let $AN_o$ represent the optimized attribute names. Through an adaptive feedback loop beginning at 310, an embodiment systematically iterates, reevaluates, and refines $AN_o$ until achieving the desired performance level:

$$AN_o^{(t+1)} = \text{Optimization}(SV, AN_o^{(t)}, HAM, DC),$$

This iterative refinement ensures that $AN_o$ accurately reflects the semantics of the extracted data.

In an embodiment, an optimization process operates within defined constraints, including performance thresholds, time considerations, and iteration limits. This ensures focused and efficient optimization efforts. Once optimization objectives are met or the iterative process concludes, the output with optimized attribute names is compiled thus:

$$\text{Optimized Dataset} = \{SV, AN_o\},$$

This 'Optimized Dataset' compiles the best $AN_o$ (attribute names) obtained during the optimization step enriched with accurately labeled attributes, serving as the foundation for subsequent phases of data comprehension and analysis.

D.3 Aspects of an Example Inference Phase and Knowledge Extraction

Figure 4:
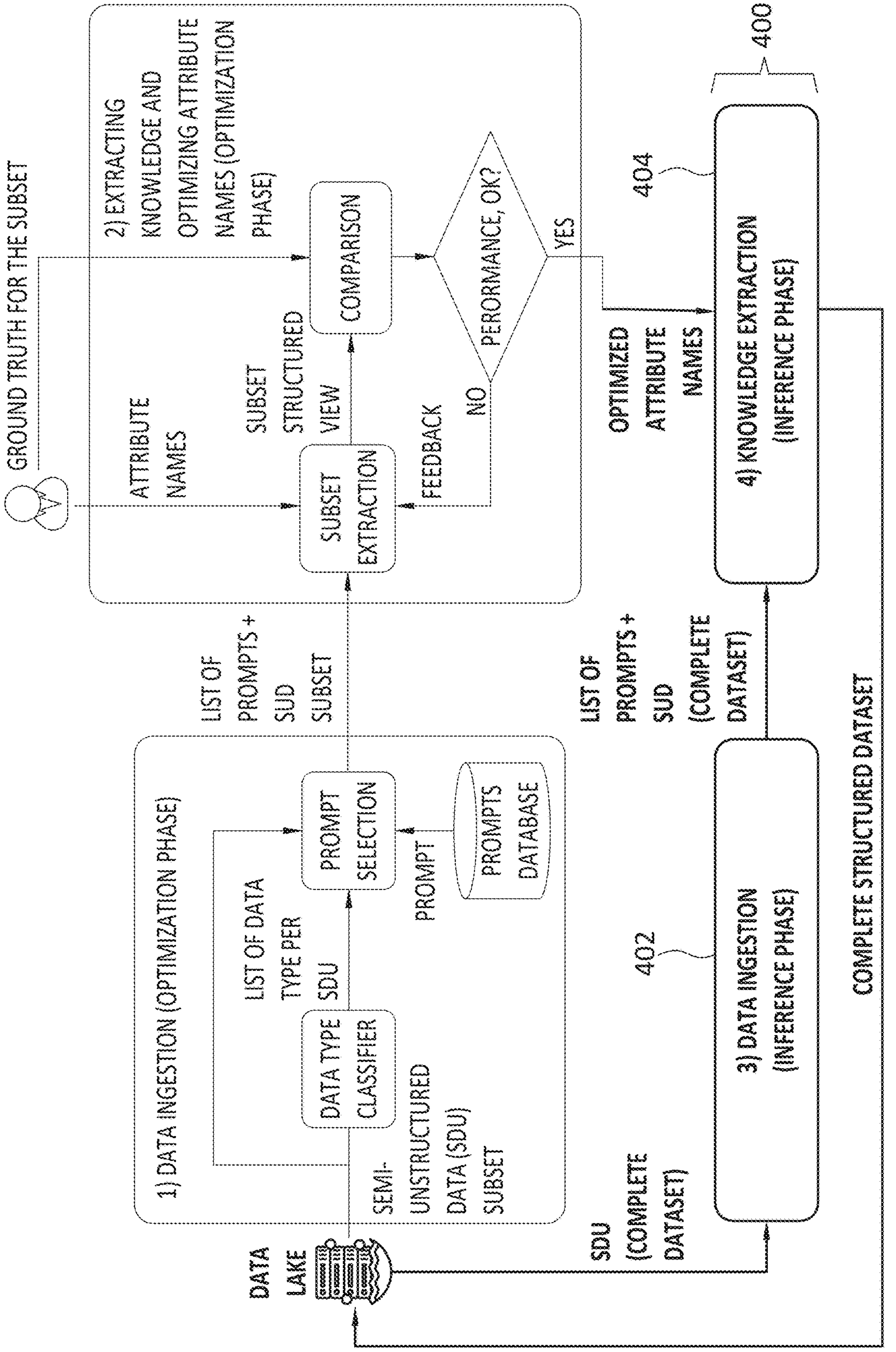
FIG. 4 discloses aspects of an inferencing process, according to one embodiment.

As shown in the example data ingestion and knowledge extraction pipelines of FIG. 4, an inference phase 400 according to one embodiment comprises a data ingestion process 402 and a knowledge extraction process 404. The data ingestion process 402 comprises a juncture where the complete SUD dataset is ingested, and the respective list of prompts is generated, as shown in FIG. 4. In an embodiment, operation of the data ingestion process 402 may be similar, or identical, as in the example optimization phase discussed earlier in connection with FIG. 2. For example, the data ingestion process 402 may be the same as in the example optimization phase referenced in the discussion of FIG. 2 except that the data ingestion process 402 uses the entire SUD dataset of the data lake. In an embodiment, the knowledge extraction process 404 simply uses the same extraction approach described in the EKOAN processes 102*b* and 300, discussed earlier herein, using only the selected prompts from the data ingestion process 402 and the already optimized attribute names.

E. ASPECTS OF SOME EXAMPLE EXPERIMENTS AND RESULTS

The experiments discussed hereafter are divided into two sections to illustrate the general functions of an embodiment. In the first section, the inventors conducted experiments to validate Mistral, an open-source model, demonstrating its competence in generating semi-unstructured data across diverse data types. In the subsequent section, an experiment is employed to illustrate the functionality of a zero-shot classifier for document type identification-which may be an important step in determining the optimal prompt for Mistral or another model that could be used.

E.1 Mistral Model to Generate Structured View Form Semi-Unstructured Data.

In this experiment, the inventors identified some basic concepts of one embodiment. To perform this test, the inventors created three synthetic datasets (XML, HTML, and email text), each one with 30 examples, and each example with the SUD view and the structured view. In this experimentation, the inventors used the Mistral 7 billion parameters open-source LLM. See [4].

To measure the performance of the LLM, the experiment counted the TP, FP, TN, and FN:

- True Positive (TP): Instances where the LLM model correctly identifies and classifies definitive attribute information in a document. It accurately captures and associates the relevant attribute data, aligning with the ground truth.
- False Positive (FP): Instances where the LLM model erroneously asserts the presence of definitive attribute information that is either absent or does not correctly align with the ground truth.
- True Negative (TN): Instances where the LLM model accurately discerns the absence of definitive attribute information in a document and appropriately returns a Null.
- False Negative (FN): Instances where the LLM model fails to recognize or extract definitive attribute information present in a document, resulting in a Null return.

With the counts of TF, FP, TN, and FN, the inventors calculated precision, recall, and F1 score. In this experiment, the inventors utilized 90 examples of semi-unstructured data: 30 examples of HTML, 30 examples of XML files, and 30 examples of email data. For each example, the structured view, with attribute names and attribute values, served as the ground truth.

The results for each dataset are present in the Table 500 disclosed in FIG. 5. The performance on HTML data indicates that Mistral V0.1 has reasonable 'Precision,' suggesting that when it identifies HTML content, it is accurate. However, the lower 'Recall' value indicates that Mistral V0.1 might miss some attribute instances of HTML, leading to an overall moderate 'F1' score. The one-shot performance on HTML data is exemplary, demonstrating the ability of Mistral V0.1 to achieve perfect 'Precision,' 'Recall,' and 'F1' score when it comes to identifying HTML content in a single attempt.

As indicated in the Table 500, Mistral V0.1 shows exceptional performance on XML data, achieving perfect scores across all metrics. This indicates its high accuracy in identifying XML content with no false positives or false negatives. Mistral V0.1 performs well on email data with a high recall, indicating its ability to identify a significant portion of email content. The precision is also reasonable, resulting in a commendable F1 score.

In summary, Mistral V0.1 demonstrates notable capabilities in identifying various data types, with particularly outstanding performance in one-shot HTML and XML. However, there is room for improvement in precision and recall for regular HTML content. Overall, the open-source LLM showcases promise in accurately categorizing different data types, making it a viable option for tasks involving HTML, XML, and email content classification. Ongoing development and optimization may further enhance its performance in the future.

E.1.1 Data

In this subsection, some examples of the data used in the experiments are presented. Particularly, FIG. 6 discloses an HTML file 600, FIG. 7 discloses an XML file 700, and FIG. 8 discloses an email.

E.2 Zero Shot Classifier (ZSC) to Data Type Identification

In this experiment, the inventors used a ZSC (facebook/bart-large-mnli model—see [3]) to identify the data type and select the best prompt for knowledge extraction. To validate this orchestration, the inventors tested the performance of the selected ZSC in the identification of the different data types, the results, presented in the Table 900 disclosed in FIG. 9, indicate that one embodiment can identify the different data types used in the experiments. As shown, the Table 900 indicates Zero-Shot Classifier performance for document content classification: evaluation metrics for HTML, XML, and email.

Particularly, these results indicate that the ZSC performed well in document content classification across different formats, namely HTML, XML, and email. The precision scores for HTML and XML categories were 100%, demonstrating higher accuracy in identifying and classifying content within these document types. For email, the precision was slightly lower at 95.67%, suggesting a high level of accuracy but with a small margin for misclassification. Overall, these findings highlight the robust performance of the ZSC in effectively categorizing diverse document content with remarkable precision.

F. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. FURTHER EXAMPLE EMBODIMENTS

Following are some further example embodiments. These are presented only by way of example and are not intended to limit the scope of this disclosure or the claims in any way.

Embodiment 1. A method for transforming unstructured data to structured data, comprising: performing a first data ingestion process that comprises (1) receiving a complete SUD (semi-unstructured data) dataset from a data lake and (2) returning a list of prompts for each SUD type with the complete SUD dataset; performing, by an LLM (large language model) a knowledge extraction process on the complete SUD dataset, and the knowledge extraction process uses optimized attribute names and the list of prompts for each SUD to obtain a complete structured dataset; and returning the complete structured dataset to the data lake.

Embodiment 2. The method as recited in any preceding embodiment, wherein a subset of the complete SUD dataset obtained from the data lake is used to select the recommended prompts for knowledge extraction of the full dataset.

Embodiment 3. The method as recited in any preceding embodiment, wherein the optimized attribute names were obtained by way of a user feedback loop mechanism.

Embodiment 4. The method as recited in any preceding embodiment, wherein an SUD subset of the complete SUD dataset obtained from the data lake is used to select the recommended prompts for knowledge extraction of the full dataset, while also selecting on or more prompts for each different data type in the SUD subset.

Embodiment 5. The method as recited in any preceding embodiment, wherein an SUD subset of the complete SUD dataset obtained from the data lake is used to select the recommended prompts for knowledge extraction of the full dataset and the SUD subset comprises multiple different data types.

Embodiment 6. The method as recited in any preceding embodiment, wherein an SUD subset of the complete SUD dataset obtained from the data lake comprises multiple different data types, and the data types were identified using a zero-shot classifier.

Embodiment 7. The method as recited in any preceding embodiment, wherein creation of the complete structured dataset is performed using a non-token-based approach.

Embodiment 8. The method as recited in any preceding embodiment, wherein the LLM comprises an open-source LLM.

Embodiment 9. The method as recited in any preceding embodiment, wherein the optimized attributes ensure that a view of the complete structure dataset accurately reflects preferences of a user based on whose input the optimized attributes were generated.

Embodiment 10. The method as recited in any preceding embodiment, wherein the optimized attribute names are generated based on attribute names initially provided by a user.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that are executed on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 10:
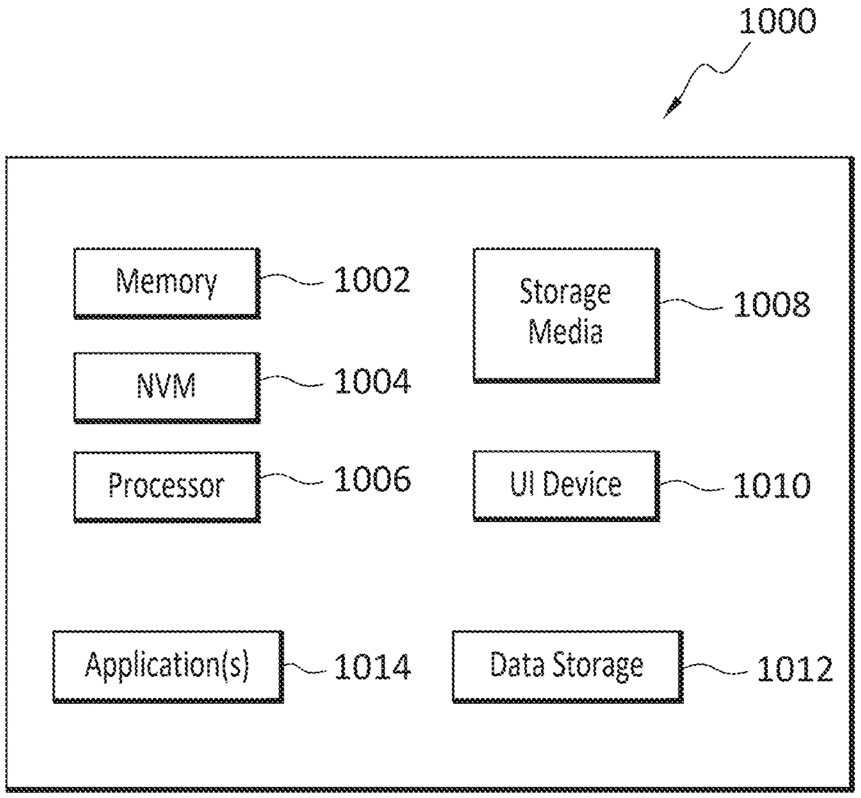
FIG. 10 discloses a computing entity configured and operable to perform any of the disclosed methods, processes, and operations.

With reference briefly now to FIG. 10, any one or more of the entities disclosed, or implied, by FIGS. 1-9, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid-state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for transforming semi-unstructured data to a structured dataset, comprising:

performing a first data ingestion process that comprises:

receiving, from a data lake, a subset of SUD (semi-unstructured data) dataset comprising a plurality of SUD records having a plurality of data type classes;

classifying, by a zero-shot classifier, each SUD record in the subset of SUD dataset into one of the plurality of data type classes;

selecting, from a prompts database, respective extraction prompt for each data type class;

generating, by a large language model (LLM), a structured view of the subset using user-provided attribute names and the selected extraction prompts;

comparing the structured view of the subset to user-provided ground truth using a performance measure; and in a case where the performance measure fails to satisfy a threshold, iteratively rewriting, by the LLM, one or more attribute names based on context from the subset and historical attribute names previously tested, re-generating the structured view using the rewritten attribute names, and re-comparing the re-generated structured view to the user-provided ground truth until the threshold or a stop criterion is satisfied, thereby returning optimized attribute names;

performing a second data ingestion process that comprises:

receiving, from the data lake, a complete set of the SUD dataset; and classifying the SUD records in the complete set and selecting respective extraction prompts for the classified SUD records;

generating, by the LLM a complete structured dataset from the complete set using the optimized attribute names and the respective extraction prompts; and returning the complete structured dataset to the data lake.

2. The method as recited in claim 1, wherein the subset of the SUD dataset obtained from the data lake is used to select recommended prompts for knowledge extraction of the complete set of the SUD dataset.

3. The method as recited in claim 1, wherein the optimized attribute names were obtained by way of a user feedback loop mechanism.

4. The method as recited in claim 1, wherein the subset of the SUD dataset obtained from the data lake is used to select recommended prompts for knowledge extraction of the complete set of the SUD dataset, while also selecting one or more prompts for each different data type in the subset of the SUD dataset.

5. The method as recited in claim 1, wherein the subset of the SUD dataset obtained from the data lake is used to select recommended prompts for knowledge extraction of the complete set of the SUD dataset, and the subset of the SUD dataset comprises multiple different data types.

6. The method of claim 1, wherein the performance measure comprises precision, recall, F1-score, or a combination thereof.

7. The method as recited in claim 1, wherein creation of the complete structured dataset is performed using a non-token-based approach.

8. The method as recited in claim 1, wherein the LLM comprises an open-source LLM.

9. The method as recited in claim 1, wherein the optimized attribute names ensure that a view of the complete structured dataset accurately reflects preferences of a user based on whose input the optimized attribute names were generated.

10. The method as recited in claim 1, wherein the optimized attribute names are generated based on attribute names initially provided by a user.

11. A non-transitory storage medium having stored therein instructions that are executable by one or more hardware processors to perform operations for transforming semi-unstructured data to a structured dataset, the operations comprising:

performing a first data ingestion process that comprises;

receiving, from a data lake, a subset of SUD (semi-unstructured data) dataset comprising a plurality of SUD records having a plurality of data type classes;

classifying, by a zero-shot classifier, each SUD record in the subset of SUD dataset into one of the plurality of data type classes;

selecting, from a prompts database, a respective extraction prompt for each type class;

generating, by a large language model (LLM), a structured view of the subset using user-provided attribute names and the selected extraction prompts;

comparing the structured view of the subset to user-provided ground truth using a performance measure; and in a case where the performance measure fails to satisfy a threshold, iteratively rewriting, by the LLM, one or more attribute names based on context from the subset and historical attribute names previously tested, re-generating the structured view using the rewritten attribute names, and re-comparing the re-generated structured view to the user-provided ground truth until the threshold or a stop criterion is satisfied, thereby returning optimized attribute names;

performing a second data ingestion process that comprises:

receiving, from the data lake, a complete set of the SUD dataset; and classifying the SUD records in the complete set and selecting respective extraction prompts for the classified SUD records;

generating, by the LLM a complete structured dataset from the complete set using the optimized attribute names and the respective extraction prompts; and returning the complete structured dataset to the data lake.

12. The non-transitory storage medium as recited in claim 11, wherein the subset of the SUD dataset obtained from the data lake is used to select recommended prompts for knowledge extraction of the complete set of the SUD dataset.

13. The non-transitory storage medium as recited in claim 11, wherein the optimized attribute names were obtained by way of a user feedback loop mechanism.

14. The non-transitory storage medium as recited in claim 11, wherein the subset of the SUD dataset obtained from the data lake is used to select recommended prompts for knowledge extraction of the complete set of the SUD dataset, while also selecting one or more prompts for each different data type in the subset of the SUD dataset.

15. The non-transitory storage medium as recited in claim 11, wherein the subset of the SUD dataset obtained from the data lake is used to select recommended prompts for knowledge extraction of the complete set of the SUD dataset, and the subset of the SUD dataset comprises multiple different data types.

16. The non-transitory storage medium as recited in claim 11, wherein the performance measure comprises precision, recall, F1-score, or a combination thereof.

17. The non-transitory storage medium as recited in claim 11, wherein creation of the complete structured dataset is performed using a non-token-based approach.

18. The non-transitory storage medium as recited in claim 11, wherein the LLM comprises an open-source LLM.

19. The non-transitory storage medium as recited in claim 11, wherein the optimized attribute names ensure that a view of the complete structured dataset accurately reflects preferences of a user based on whose input the optimized attribute names were generated.

20. The non-transitory storage medium as recited in claim 11, wherein the optimized attribute names are generated based on attribute names initially provided by a user.

* * * * *